United States Patent [19]
Kocznar et al.

[11] Patent Number: 5,124,535
[45] Date of Patent: Jun. 23, 1992

[54] CONTROL STATION FOR DATA CARRIERS

[75] Inventors: Wolfram Kocznar, Innsbruck; Kurt Wallerstorfer, Strasswalchen, both of Austria

[73] Assignee: Skidata Computer Gesellschaft m.b.h., Gartenau, Austria

[21] Appl. No.: 358,376

[22] PCT Filed: Oct. 16, 1987

[86] PCT No.: PCT/AT87/00059
§ 371 Date: Jun. 23, 1989
§ 102(e) Date: Jun. 23, 1989

[87] PCT Pub. No.: WO88/03295
PCT Pub. Date: May 5, 1988

[30] Foreign Application Priority Data

Oct. 23, 1986 [AT] Austria ............ 2819/86
Oct. 23, 1986 [AT] Austria ............ 2820/86
Oct. 23, 1986 [AT] Austria ............ 2828/86

[51] Int. Cl.$^5$ ............................................. G06K 5/00
[52] U.S. Cl. .................................. 235/380; 235/382; 235/384
[58] Field of Search ............. 235/375, 380, 382, 468, 235/384

[56] References Cited

U.S. PATENT DOCUMENTS

| | | | |
|---|---|---|---|
| 3,866,874 | 4/1974 | Ehrat | 235/380 |
| 4,325,146 | 4/1982 | Krigh | 235/380 |
| 4,4325,146 | 4/1982 | Lennington | . |
| 4,476,468 | 10/1984 | Goldman | 235/380 |
| 4,501,958 | 2/1985 | Glize | 235/382 |
| 4,853,524 | 8/1989 | Yamaguchi | 235/468 |

FOREIGN PATENT DOCUMENTS

| | | |
|---|---|---|
| 1184658 | 3/1985 | Canada . |
| 0040544 | 11/1981 | European Pat. Off. . |
| 0061373 | 9/1982 | European Pat. Off. . |
| 61-174256 | 7/1986 | Japan ............ 235/468 |
| 8803295 | 5/1988 | World Int. Prop. O. . |

Primary Examiner—Harold Pitts
Attorney, Agent, or Firm—Lorusso & Loud

[57] ABSTRACT

In order to control or identify an authorization of access, use is made of a control station which has two different read-write systems. The first unit is designed in particular for remote control of active date carriers comprising a microcomputer. The second read-write system is designed for the control of passive data carriers, on which the data are stored in a magnetic or optical form. Preferably both read-write systems are provided with parallel outputs, to which a switching system is connected, which passes to the peripheral systems the output signals produced by means of the desired data carrier.

12 Claims, 5 Drawing Sheets

5,124,535

CONTROL STATION FOR DATA CARRIERS

BACKGROUND OF THE INVENTION

The invention is concerned with a device for machine communication in examining and changing of data in data carriers exhibiting a memory, especially in the identification of persons, in checking the right to entry etc., at at least one control station. Such devices are used for various purposes, for example, at ski lifts for checking or devaluating tickets, in parking garages to permit entering and exiting.

Up until now, primarily cards with magnetic stripes and punch cards were used for the identification of persons or for entry control, that is to say, passive data carries. These must be inserted into a slot of a reading device at the control station which leads to a relatively large expenditure of time and inconvenience for the user.

Active data carriers are known in which the data carrier itself contains electronic components, such as computers, displays, etc. Examples of this are EP-B-19280 (ID card and electrical contact surfaces), EP-A-142013 (Data carriers with inductive data transfer and destruction of the data upon mechanical intervention), EP-A-168836 (Data card for cash dispensers with optical data transfer), EP-A-196028 (Value card with electrical contact surfaces), and, WO-A-86/04705 (Telephone value card with inductive data transfer). The data carriers which are expensive as compared with magnetic stripe or punch cards cannot be used for general purposes of the type mentioned in the beginning especially because of their high cost. In mass use for admission of limited cost, for example, for single tickets at ski lifts, they would not be accepted by the public. For this reason, the control devices up to now have been indispensable. Because, however, control through active data carriers would considerably increase the productivity of every control station, it is the goal of the invention to create a control system without the disadvantages mentioned above.

SUMMARY OF THE INVENTION

This is achieved according to the invention insofar as the control station exhibits a first control device for communicating with active data carriers which contain a microcomputer and a second control device for controlling passive data carriers in which the data are stored in, for example, magnetic or optical form.

The device according to the invention therefore allows for an efficient combination of both control systems, reduces waiting time and increases comfort for all users.

The data to be controlled are in an initializing station stored into the data carriers and checked by the control station. Active data carriers can be used repeatedly by erasing and through the input of new data. Thus they can be used as yearly cards, permanent ID cards for repeating events and so forth, whereby simply the expiration date has to be checked by the control station, which date has to be newly stored after expiration for reuse. Such a data carrier could also be handed out upon deposit, or could be bought back again after its use.

These data carriers are particularly economical for season tickets or yearly passes for large scale use because the generating costs represent only an acceptable percentage of the embodied value.

In contrast, for services of limited value, for which deposit or buy-back does not provide any advantages, for example, single admission tickets, single fares, short term parking garage tickets, etc., the usual passive data carriers, which can be discarded after devaluation by the second control device, can be used. Both control devices of the control station exhibit preferably parallel outputs to which a conversion unit is connected, to which peripheral devices, for example, a signal lamp, a barrier, a turnstile, or a central computer for the settlement of accounts, etc., are connected to the conversion unit.

A preferred execution, which allows for a considerable acceleration of the control of active data carriers provides for the first control device of the control station to have a transmitter-receiver unit for communication at a distance with an approached data carrier exhibiting a transmitter-receiver unit.

For identification or admission, the data carrier which can be read at a distance must be simply be brought into the control range of the transmitter-receiver unit of the first control device, where in a very short time, preferably less than 1 second, the entitlement and the validity of the entitlement can be examined. It is clear that thus passing through the control station is accelerated considerably and waiting times are reduced. The time saved becomes especially apparent, for example, at highway tool booths or at ski lifts.

Thus, it is provided for in one of the executions that the control station be combined with a multicolored light for displaying the result of the control, whereby the transmitter and the receiver of the first reading and writing device as well as the lights of the signal are arranged in one housing which has a matt glass cover. Thus, room-saving construction closed off from the outside can be achieved.

In the preferred execution, every data carrier equipped with a transmitter-receiver unit exhibits a stand-by circuit which can be activated by means of a signal given off by the first control device of the control station, and thus, there is a minimum of energy use. Therefore, the device can be used for several years even with high frequency of use.

Further, a preferred execution provided for the transmitter-receiver unit to be designed for radio transmission in a preferred carrier frequency range of up to 250 kHz. This requires little transmission energy, which is essential for the energy supply of the data carrier. It further makes possible the use of magnetic antennas, thus, no undesired shielding effects occur.

In order not to disturb the exchange of communication, a preferred execution provides for a difference in carrier frequencies for the data transfer between the control station and the data carrier and the data carrier and the control station. Thus, with a transmission oscillator in the control station will be sufficient if the transmitter-receiver unit contains a frequency divider.

The space for communication is chosen to be much smaller than the object to be acquired, so that data transfer within the acquisition space only occurs as the data carrier approaches the region of the control station.

By limiting the communication area to a size which excludes with certainty the circumstantial presence of a data carrier which must not respond and thus makes much more difficult a deliberate disturbance by such a carrier, a comfortable, time-saving remote control is achieved. This requires a conscious and deliberate handling of the data carrier, comparable to the insertion into an intake slot.

The limited communication area, the dimensions of which are in accordance with the object to be acquired, is already secured from foreign influences by the object itself. Therefore, the device exhibits a great deal of operational security in spite of the data transfer at a distance.

For areas for the entry of persons to be passed through in one lane, the largest range of the communication space is provided vertical to the lane at, for example, 10 cm to 30 cm, preferably 20 cm.

For motor vehicles to be passed through in one lane, the largest range of the communication space can be between 50 cm and 200 cm, preferably 100 cm. The communication space will be ball-shaped or cylindrical.

In another execution data transfer is provided for by means of light waves, whereby here the infrared range in particular is chosen, however, laser light could be used.

In data transfer by means of light waves, the limited transfer area can be shielded from outside influences without much difficulty. This can occur simply by means of a limiting blind for the control area provided at a distance to the transmitter and the receiver.

The application possibilities can be increased considerably if, for example, a continuous devaluation takes place at each control station until a "stock" is used up. Such a data carrier can be used, for example, as a coupon for several rides or as an admission ticket for events with consumption (restaurants, leisure areas and open-air areas). It is advantageous in this execution that the remaining value can be displayed, whereby the remaining value is in accordance with the type of use, for example, the expiration date can be shown, the next-to-last ride of a transportation coupon or the like, in order to make timely re-valuation in an initialization station possible. With the aid of the computer provided in the data carrier, information and functions that complement one another or overlap can be split between the data carrier and the control station at will.

In a further execution, the second read-write device of the control station contains an insertion slot with a read-write head and a print head. Thus, changes of the magnetic or optical designation or uses of the passive data carriers can also be printed on the carrier and can be seen visually.

BRIEF DESCRIPTION OF THE DRAWINGS

In the following, the invention will be described in more detail with the aid of the figures but is not limited to such.

DESCRIPTION OF THE PREFERRED EMBODIMENT

Figure 1:
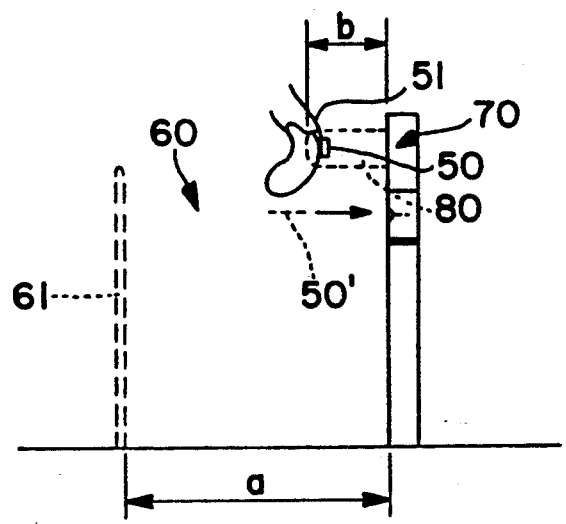
FIG. 1 shows a schematic representation of an acquisition space of a control station.

Devices according to the invention serve the purposes of communicating between a control station 70 and data carriers 50, 50' within a real or assumed limitation 61 in an acquisition space 60 which corresponds in its dimensions with the object 51 (person or object) provided with the data carrier 50, 50'. For example, the acquisition space 60 can form a lane for persons to pass through of size a in which the border 61 is at a distance from the control station 70.

The control station 70 is designed for selective communication with active data carriers 50 and passive data carriers 50' and thus contains two control devices 31 and 32 which are located together in a common housing 30. The first control device 31 is thus provided for communication with active data carriers 50 which contain a microcomputer (FIGS. 5 and 10) and the second control device 32 processes passive data carriers 50', especially magnetic stripe cards, punch cards, cards with bar codes, etc. such as are already in use. A passive data carrier 50' is thus just indicated in broken lines in FIG. 1.

In the execution shown more closely in FIGS. 2-5, the transfer of data to the first control device 31 occur by means of radio, whereby the transmitter-receiver frequencies preferably lie in the range of 100 kHz and under. Thus magnetic antennas for transmitter 15 and receiver 16 can be used, so that no undesired shielding effects occur. Limited transmission energy limits the communication space to a region 80 of the control station 70.

Region 80 exhibits a maximum range b which is much smaller than size a of the acquisition space and, therefore, for data transfer between the data carrier 50 and the control station 70, the data carrier 50 must be brought into region 80 of the control station. This means that object 51 comes so much into the vicinity of the control station 70 that the possibility of a communication disturbance caused by another data carrier which happens to be in the acquisition space 60 or is there deliberately, can, in all practicality, be excluded. If measurement is a 50–70 cm, for example, then a suitable maximum range b of the region 80 would be approximately 10 to 30 cm.

Figure 2:
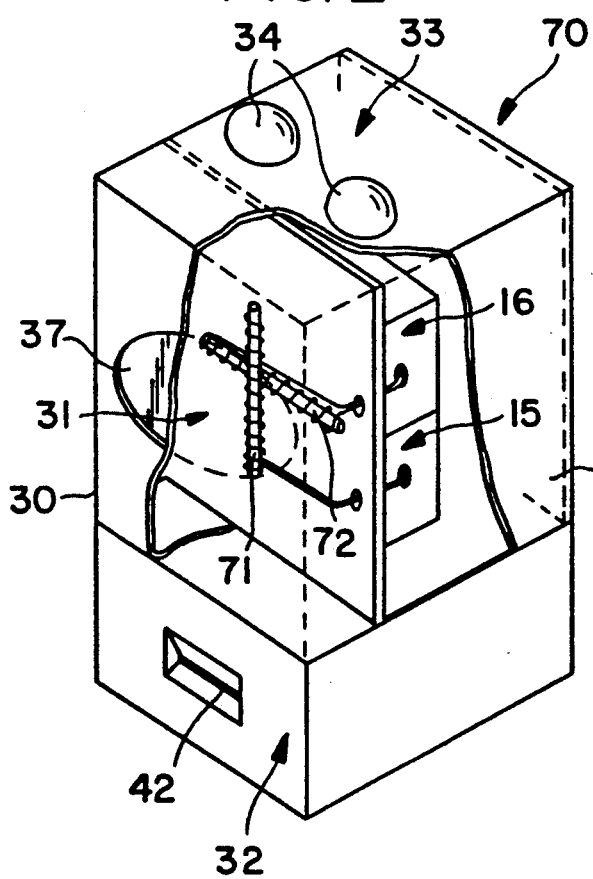
FIG. 2 a control station in schematic partial-section.
Figure 3:
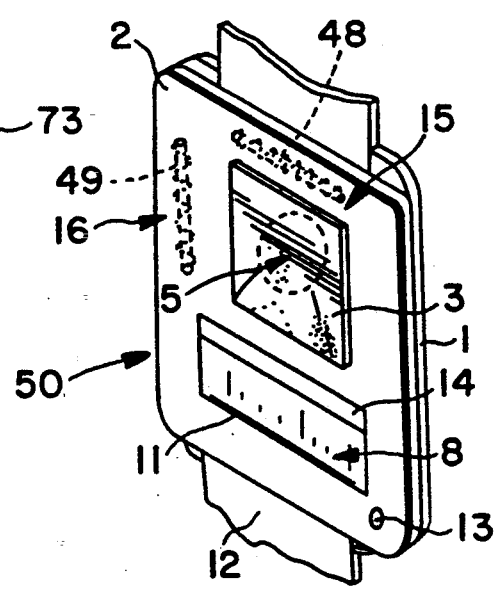
FIG. 3 an active data carrier for communicating with the control station according to FIG. 2.

As can be seen from FIGS. 2 and 3, the transmission antennas 71, 48 and the receiver antennas 72, 49 in both the first control device 31 of the control station 70 (FIG. 2) and in the data carrier 50 (FIG. 3) are placed at a 90° angle to one another, so that they do not influence one another magnetically. Because of the limited range b of the communication space, it is not necessary to provide undirectional antennas. It would, however, be conceivable to provide two receiver coils 72, 49 placed against one another in the control station 70 and/or in the data carrier 50. On the back, the housing 30 is provided with a shield. With the aid of both block diagrams shown in FIGS. 4 and 5 of the first control device 31 of the control station 70 and the data carrier 50, the communication between the control station and the data carrier 50 moved into range 80 is explained in more detail.

Figure 4:
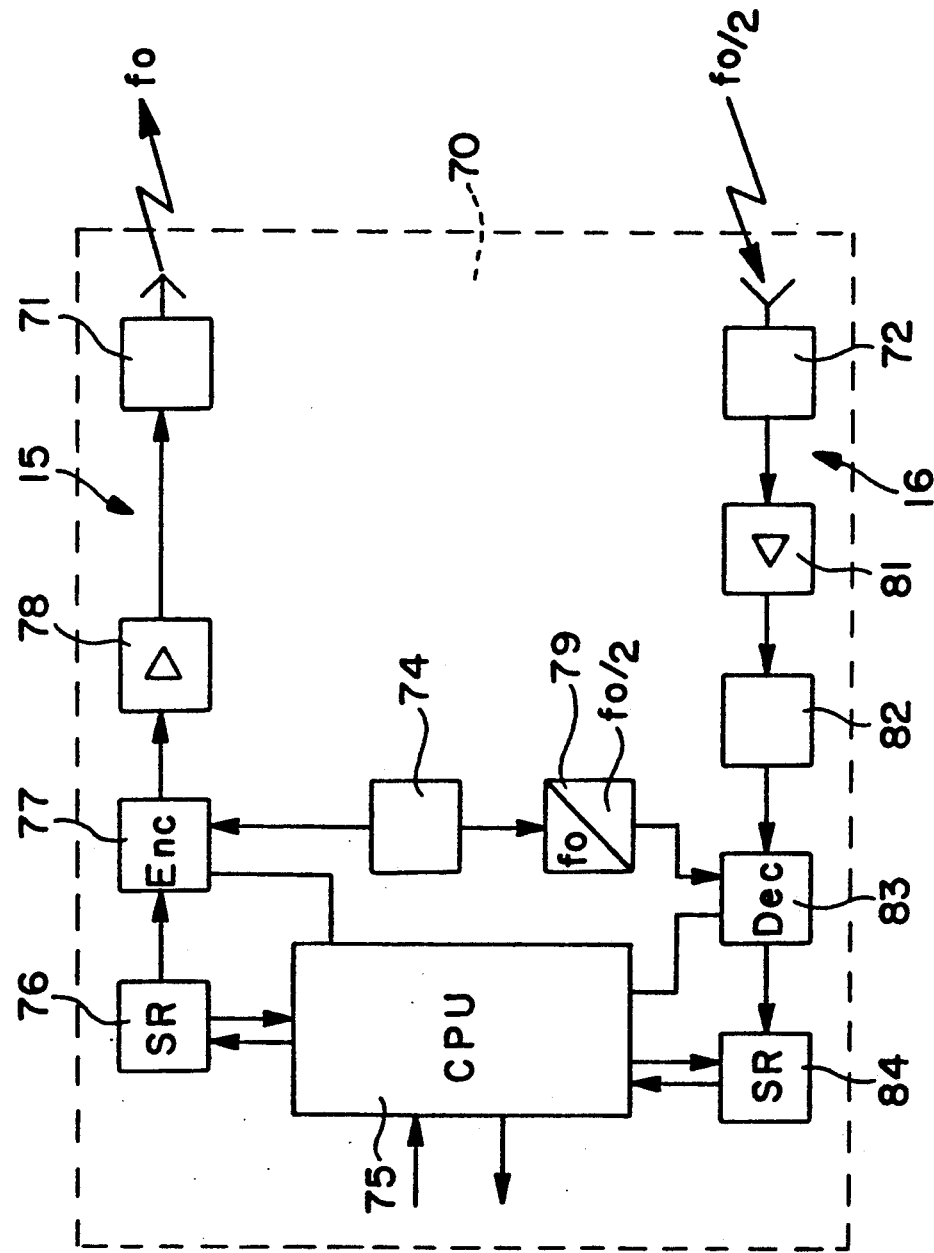
FIG. 4 a block diagram of the control station according to FIG. 2.

The control station 70 emits a designation number with a carrier frequency $f_o$ (for example 100 kHz) (FIG. 4). To this the central processing unit 75 (CPU) of the the control station transfers the corresponding data to a shift register 76 (SR) from which these are read serially in an encoder 77. The encoder 77 is connected with an oscillator 74 for the carrier frequency $f_o$. The transmission antenna 71 is driven via corresponding amplifiers 78. The signals emitted from control station 70 (FIG. 5) are received in the data carrier 50 by the receiver antenna 49 which is turned to the carrier frequency $f_o$. The signals are brought to a low-pass filter 54 via a delimiter 52 and an amplifier 53. The low-pass filter is connected to a decoder 56.

Between the low-pass filter 54 and the decoder 56 a time function element 55 (t) is arranged which prevents signals which are coincidentally received from "awakening" the processor 20 (CPU) in the data carrier 50. The decoder 56 sends the decoded data to shift register 57 (SR) which awakens the process 20 via an interrupt so that the processor can take over the read recognition received.

The process 20 recalculates the read recognition with a set algorithm and then sends its own additional data carrier number to the control station 70 retour. For the transmitting the data carrier 50 requires the carrier frequency $f_o$. This frequency is led via a frequency divider 58

$$\left(f_o / \frac{f_o}{2}\right)$$

to an encoder 63 which receives the corresponding data from the processor 20 via a shift register 62 (SR). The transmission frequency is now $f_o/2$. This circuit has the advantage that in the data carrier 50, no individual constant oscillator is required which must be turned to the control station 70. The signals arrive via an amplifier 64 and the transmission antenna 48 of the data carrier 50 to the receiver antenna 72 of the first control device 31 of the control station 70. From there they are fed to a decoder 83 via an amplifier 81 and a low-pass filter 82.

From the decoder the data arrive at a shift register 84 to the CPU 75. The CPU calculates the data received with the same algorithm as in the data carrier 50, and it therefore can recognize any attempts at manipulation, whereby a frequency divider 79 is provided for the transmission oscillator 74. The same transmission frequency $f_o/2$ coming from the data carrier 50 can thus be compared directly.

If, for example, either the control station 70 or especially the data carrier 50 are stimulated by a fraud, then the true partner can interrupt the data transfer for a certain time or permanently after a certain number of attempts at transfer. After this first data exchange, the control station 70 and the data carrier 50 are recognized by one another and at the same time an examination of the authenticity of both partners has taken place, so that the real data traffic can begin, dependent upon its concrete application. At the close of this data transfer, the control station 70 clears itself for the next application and calls with its identifier again until the next answer is received from a following data carrier 50.

As already mentioned, the processor 20 of the data carrier is normally in the sleep-mode, an inactive operational state with minimum electricity consumption. It only springs into action when valid data are received.

Figure 5:
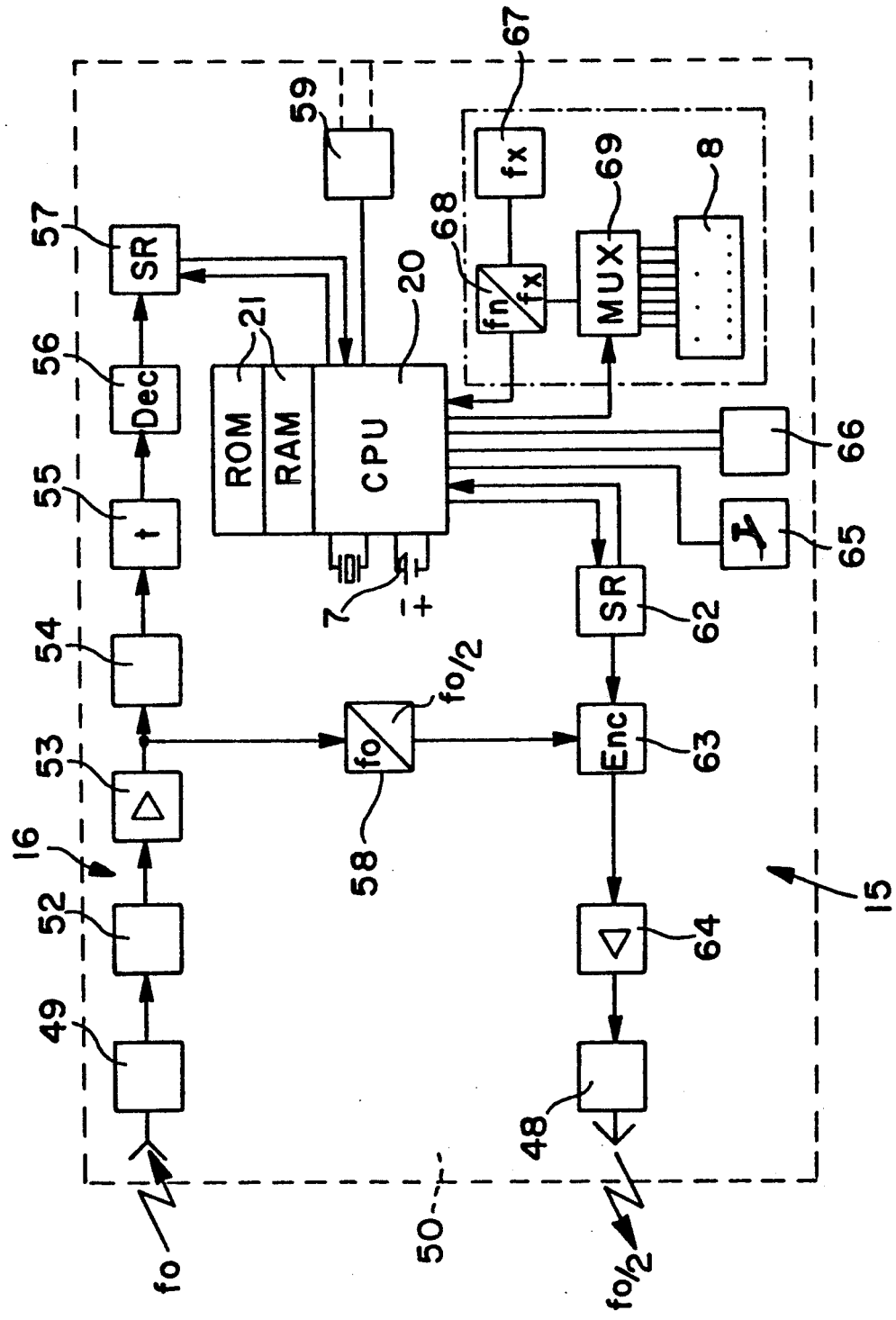
FIG. 5 a block diagram of the data carrier according to FIG. 3.

It is further possible to awaken the processor 20 by means of a built-in key 65 and for example, to display on display 8 the current status (number and value of the stored entitlements), as well as the transaction carried out (FIG. 5).

Finally, it is even possible to connect a keyboard 66, for example, for computer functions, to enter personal ID numbers (PIN) etc. And certain actions can be made dependent on the entry of the ID number. Provision is also made for connection with the process 20 via a serial interface 59.

The data carrier 50 exhibits is own commutation, in order to consume as little electricity as possible during inactive operation. This circuit consists of a clock oscillator 67, (fx), a programmable divider 68 (fn/fx) and a multiplexer 69 (MUX) for the LDC display 8. Cycle inaccuracies can be remedied by program control. The memory of the processor 20 has the advantage of possessing a relatively small ROM-range and a relatively large RAM-range (for example, 1 kb and 4 kb). In ROM only the basic routines for serving the periphery module and for data traffic are stored. In the RAM, application-specific programs and all data are stored. Thus, all changes can easily take place and all transactions can be examined even after the fact. The modules as described, of the data carrier 50, with the exception of the quartz, the LCD-display 8 and the transmitter/receiver antennas 48, 49 as well as some periphery building blocks are integrated to advantage in a single chip.

Figure 8:
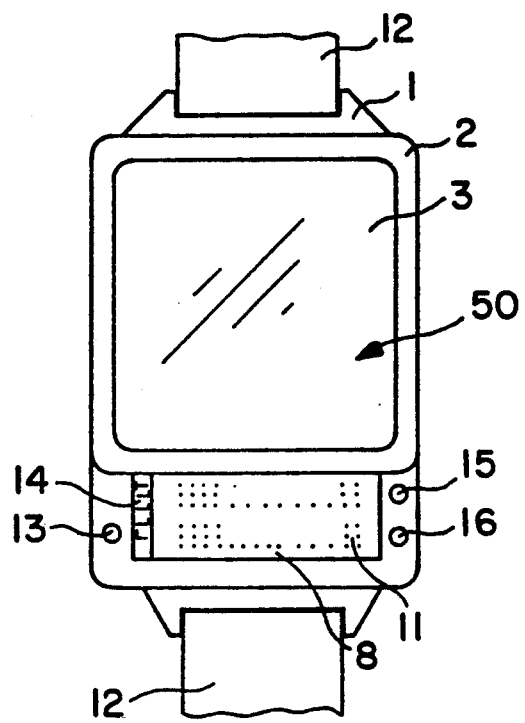
FIG. 8 shows a top view of a second execution of an active data carrier for communicating with the control station according to FIG. 7.
Figure 9:
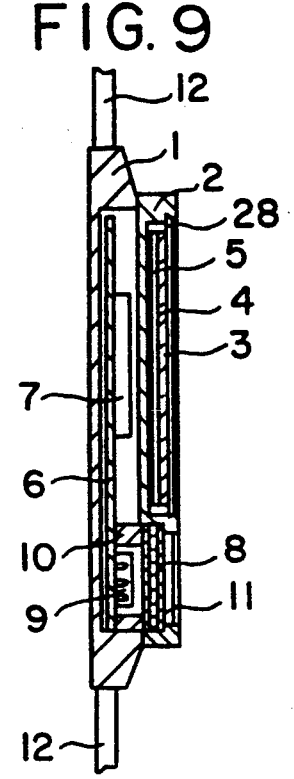
FIG. 9 a longitudinal section of the data carrier according to FIG. 8.
Figure 10:
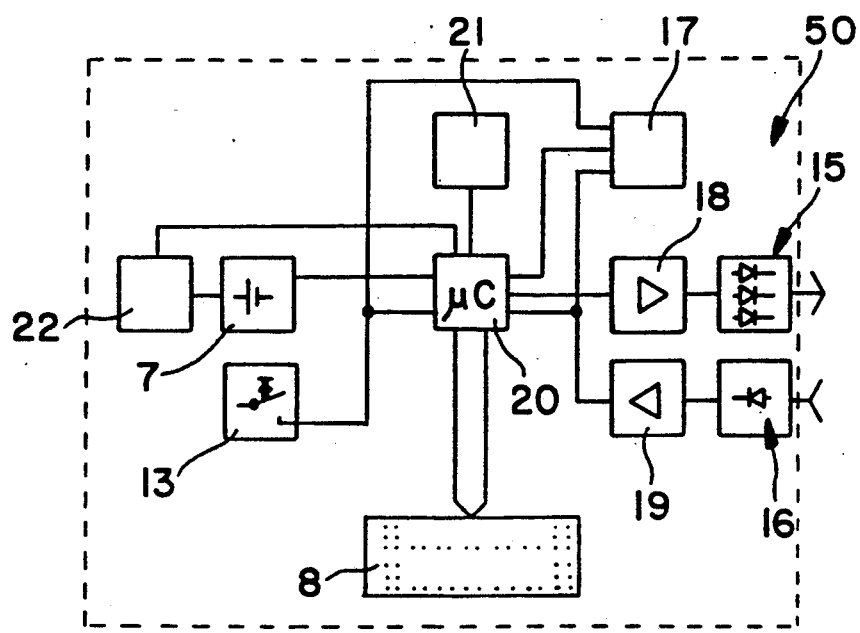
FIG. 10 a block diagram of the data carrier according to FIG. 8.

In FIGS. 8 through 10, an execution of a data carrier for optical data transmission, especially by means of infra-red waves is displayed. The electronics contained in the data carrier 50 can be seen in the block diagram in FIG. 10. The central microprocessor 20 (uc) is connected with infra-red transmission diodes as transmitter 15 with the corresponding transmission logic 18, with an infra-red receiver diode as receiver 16 with the corresponding receiver logic 19 which is assigned to a ready logic 17 and with an electricity source 7, whereby the electricity source 7, especially when it consists of a battery is provided with a control logic 22. The data to be input into the data carrier 50 are stored in a write-read storage 21, especially in an EEPROM or RAM and can be made visible via a liquid crystal display by pressing a button 13. The electricity source 7 can also be a rechargeable battery or a solar cell.

Figure 6:
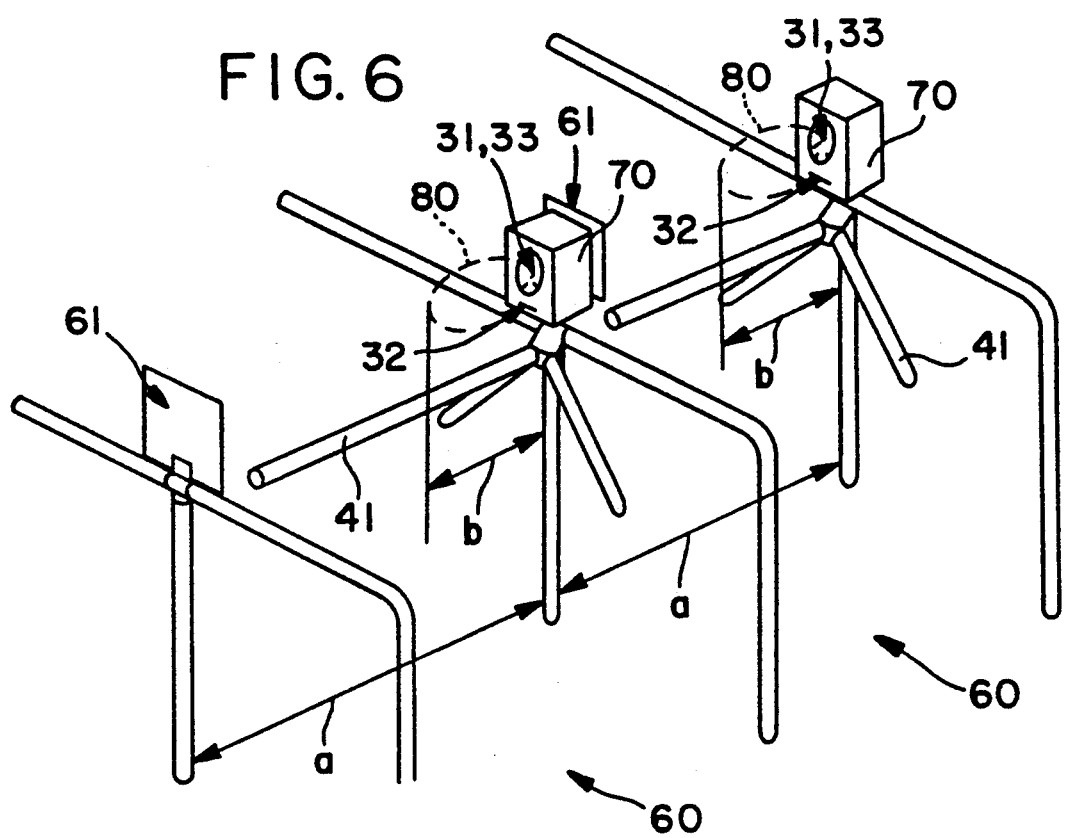
FIG. 6 a two-lane control station with gates.
Figure 7:
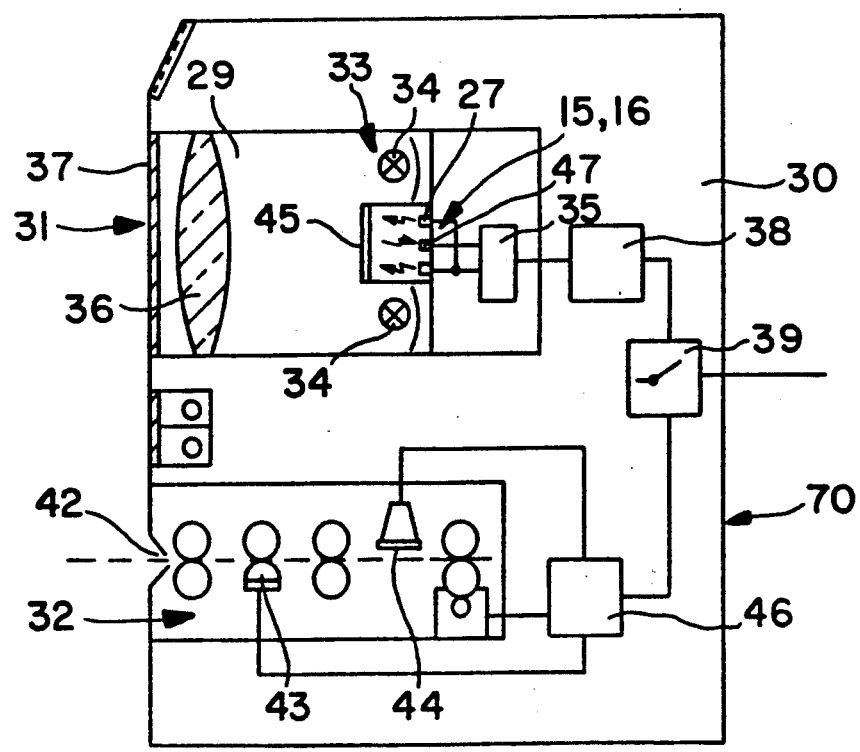
FIG. 7 a schematic cut through a second execution of a control station.

In FIG. 7 a control station 20 is shown, the first read-write device 31 of which is intended for infra-red data transfer. It contains a transmission diode 27 and a receiver diode 47, an infra-red filter 45, a selection 35 and an evaluation electronics 38 as well as the two-color signal light 33 with a red and a greem lamp 34. The transmission and receiver diodes 27, 47, the colored lamps 34 and an optics 36, which is arranged ahead, are in a pick-up area 29 which is covered to the outside by a matt glass plate 37. The second control device 32 services to control data carriers 50, for example for signal entry, on which the data are stored, for example, in magnetic or optical form, whereby the stored data are read by a write-read head 43 and are fed to an evaluation electronics 46. A printer head 44 is connected to this so that the control can be made visible. The signals emitted from the evaluation electronics 38, 46 depending upon the type of the data carrier 50, 50' to be tested are passed on via a conversion unit 39 to the signal 33 and peripheral devices connected with the equipment, for example, a computer, a gate, a turnstile 41, etc. The latter is shown in FIG. 6 in the example of a two-lane ski lift control station.

Each data carrier 50 exhibits a housing which consists of a bottom portion 1 and a top portion 2 (FIGS. 3, 8 & 9). The housing is plastic, whereby both parts 1 and 2 are preferably welded with one another. The bottom portion 1 of the housing can be present in various executions. As is shown on the bottom portion 1 there are uptakes for an armband 12, so that the data carrier 50 can be worn similarly to a watch on the forearm or the wrist. (Object 51, FIG. 1) The bottom portion 1 can also have a pin and can carry an extra incription field. The housing can also be constructed in the form of a keychain, whereby in the lower portion, a string attached to the key ring is rolled onto a spring roller. The bottom portion 1 can also have a self-stick coating. Both of these latter executions are intended especially for motor vehicles (parking garages, toll booths, etc.)

The top portion 2 exhibits a mounting 28 for a photo 5 or the like which is closed by a cover 3. The cover 3 caries an adhesive coating 4 on the inside on which the photo 5 is glued. The kind of adhesive is thereby chosen so that when the photograph 5 is separated, the photo is destroyed and thus any exchange for another photo becomes apparent. Underneath the cover 3 in the upper portion 2, a cover 11 is placed under which the liquid crystal display 8 is arranged. Next to the display or the photo cover 3, the transmitter 15 and the receiver 16 for the reception and emission of signals are located. They key 13 serves, as mentioned, to make visible the data contained in the data carrier 50 on the display 8. On the display 8 there is also a number field 14 with a visually readable, individual number which can be engraved or printed. This same "current number" can also be on the cover 3 or on the photo 5. The display 8 is fed by a chip 9 in normal fashion by pressing a key via contact 10. The chip is arranged on a substrate. The electricity supply comes from an electricity source 7, for example, a battery, a solar cell, etc.

For the control of an active data carrier 50, the carrier is held in the communication area in region 80 of the first control device 31 of control station 70, (FIG. 1) whereby a transmission signal of the control station activates the ready logic of the data carrier 50, and the stored data can be queried.

If the data carrier is a multiple ride car or a card to be punched, then at control station 80, not only is the validity examined, but the card also is partially devalued. With this sort of data carrier, the additional storage of its individual number is particularly advantageous because the control station can keep account of the continuous devaluation if the control station is hooked up to a computer and the numbers are transferred to a number log. The data carrier 50 contains a microcomputer and information, and functions can thus be divided as desired between the data carrier 50 and the control station 70, which supplement one another or overlap, as the case may be. Accelerated control is made possible by the distance transfer of the data whereby the use is made much simpler and more pleasant for the owner of the data carrier 50 because he must only bring the carrier into the communication space of region 80 of the control station 70. Because new initialization is possible after expiration date, the higher production costs of the active data carrier 50, especially for early passes or season tickets or ski passes, etc. are of lesser meaning.

Single entries, such as single fares and so forth are controlled using the cards up to now, that is, passive data carriers 50', which are inserted into the second control device 32 of the control station 70 in the usual fashion.

We claim:

1. A control station for the examination of data stored in data carriers, comprising
   a first control device comprising a transmitter/receiver unit for a distant control of an approached data carrier also having a transmitter/receiver unit, and
   a second control device comprising an insert slot for a control of a data carrier to be inserted into the slot,
   the first and second control deices having parallel outputs connected to a conversion unit, and at least one peripheral device being connected to the conversion unit and controlled by the output signal generated by the data carrier.

2. A control station according to claim 1, wherein a peripheral device is formed by a multi-color signal lamp arranged in the housing to display the control result, the transmitter/receiver unit of the first control device and the lamps of the signal being covered by a common covering of frosted glass.

3. A control station according to claim 1, wherein each data carrier equipped with a transmitter/receiver unit comprises a ready circuit which can be activated by means of a signal emitted by the first control device.

4. A control station according to claim 1, wherein the transmitter/receiver unit is designed for radio transmission with a carrier frequency range up to 250 kHz.

5. A control station according to claim 4, wherein the transmitter/receiver unit comprises magnetic antennas.

6. A control station according to claim 1, wherein each transmitter/receiver unit is designed for light wave transfer.

7. A control station according to claim 6, wherein each transmitter/receiver unit is designed for infrared range.

8. A control station according to claim 6 further comprising a limiting blind arranged at a distance to the transmitter/receiver unit.

9. A control station according to claim 1, wherein the second control device comprises a write-read head and a print head subsequent to the insert slot.

10. A control station according to claim 1, wherein both control devices are arranged in a common housing.

11. A control station according to claim 4, wherein the carrier frequencies for the data transfer from the control station to the data carrier as well as from the data carrier to the control station are different, the transmitter/receiver unit of the control station comprising a transmission oscillator, and the transmitter/receiver unit of the data carrier comprising a frequency divider.

12. A control station according to claim 6, further comprising a limiting blind arranged at a distance to the transmitter/receiver unit.

* * * * *